Dec. 26, 1967 M. E. GERRY 3,359,665
COMBINATION SOUND AND SLIDE PROJECTOR
Filed April 20, 1965 5 Sheets-Sheet 4
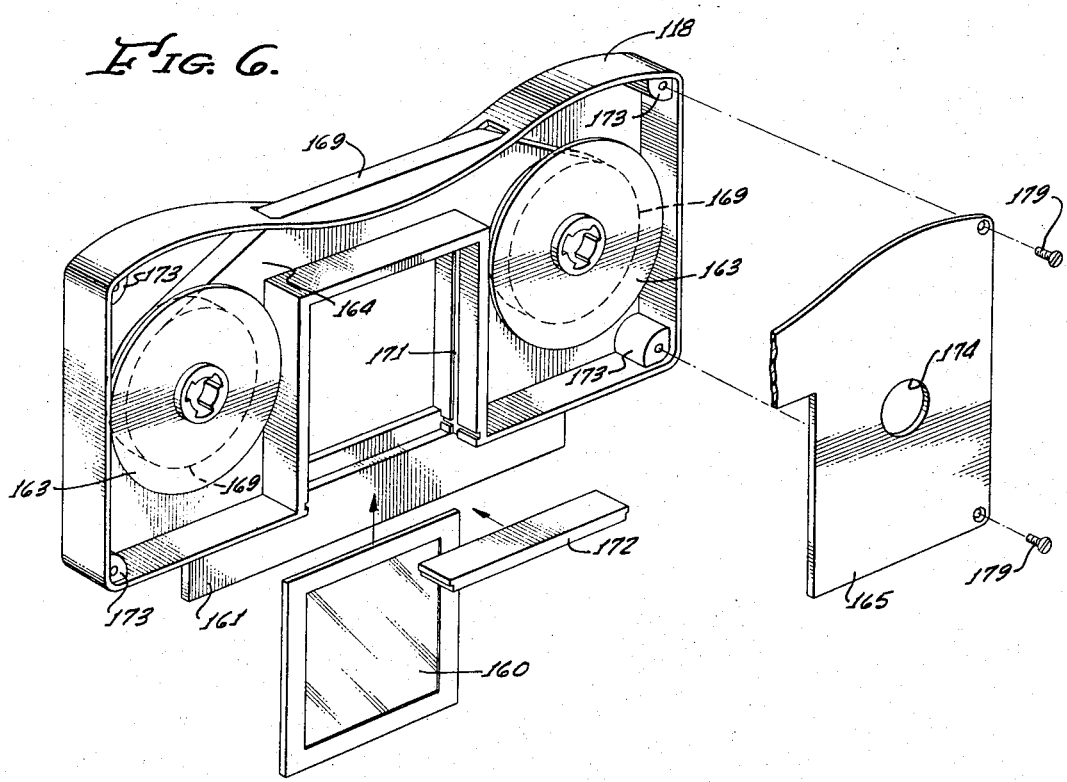
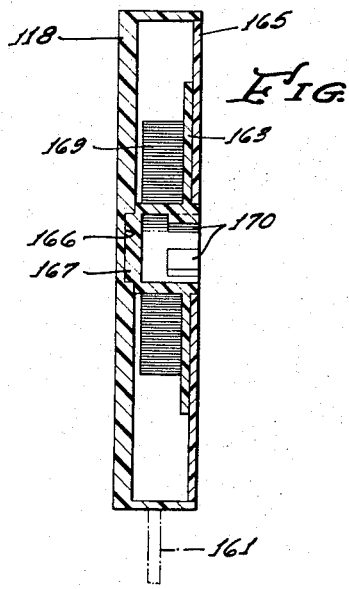
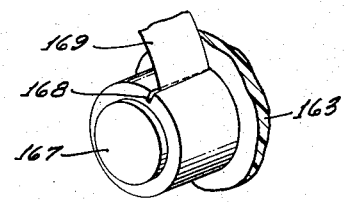
INVENTOR.
Martin E Gerry

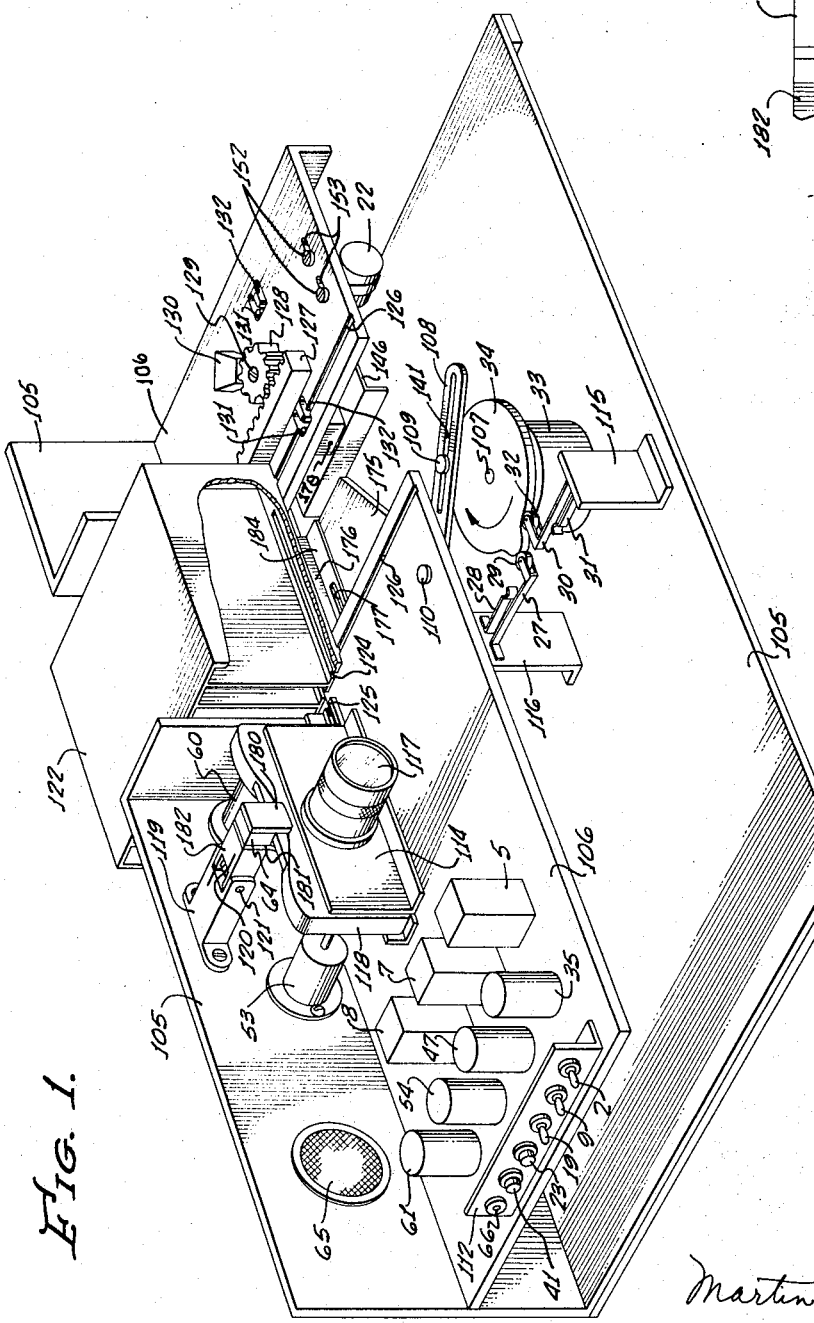

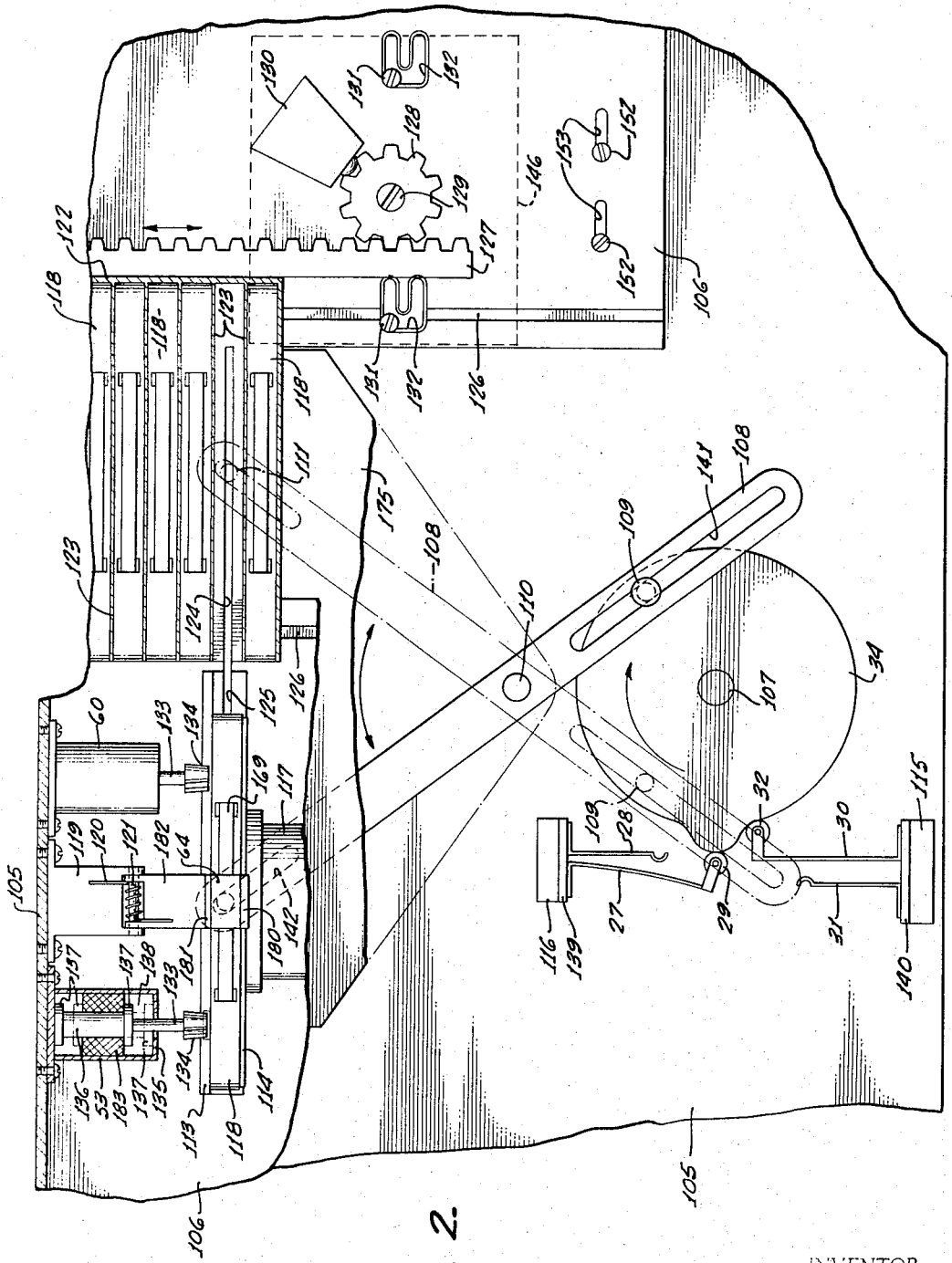

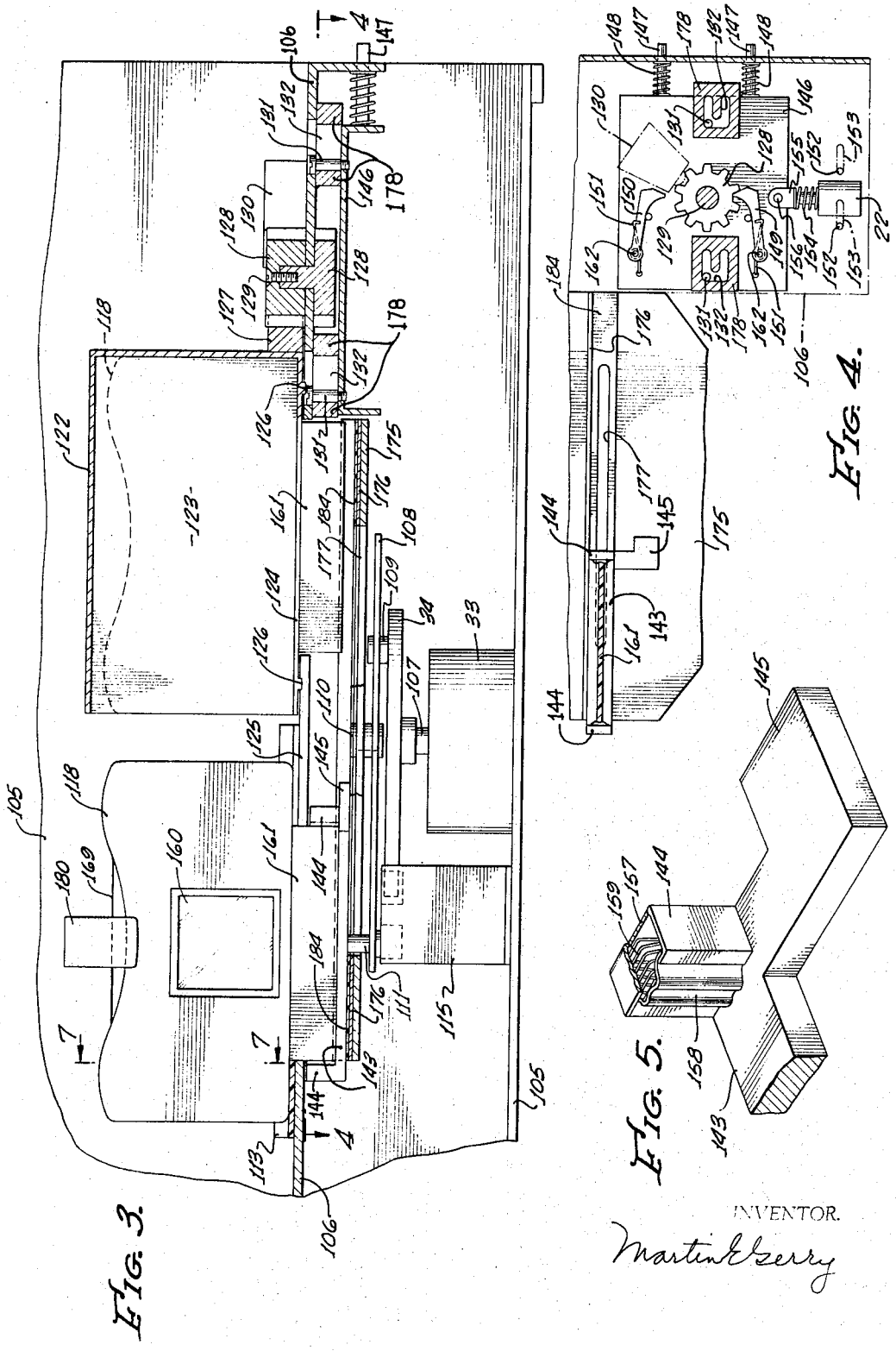

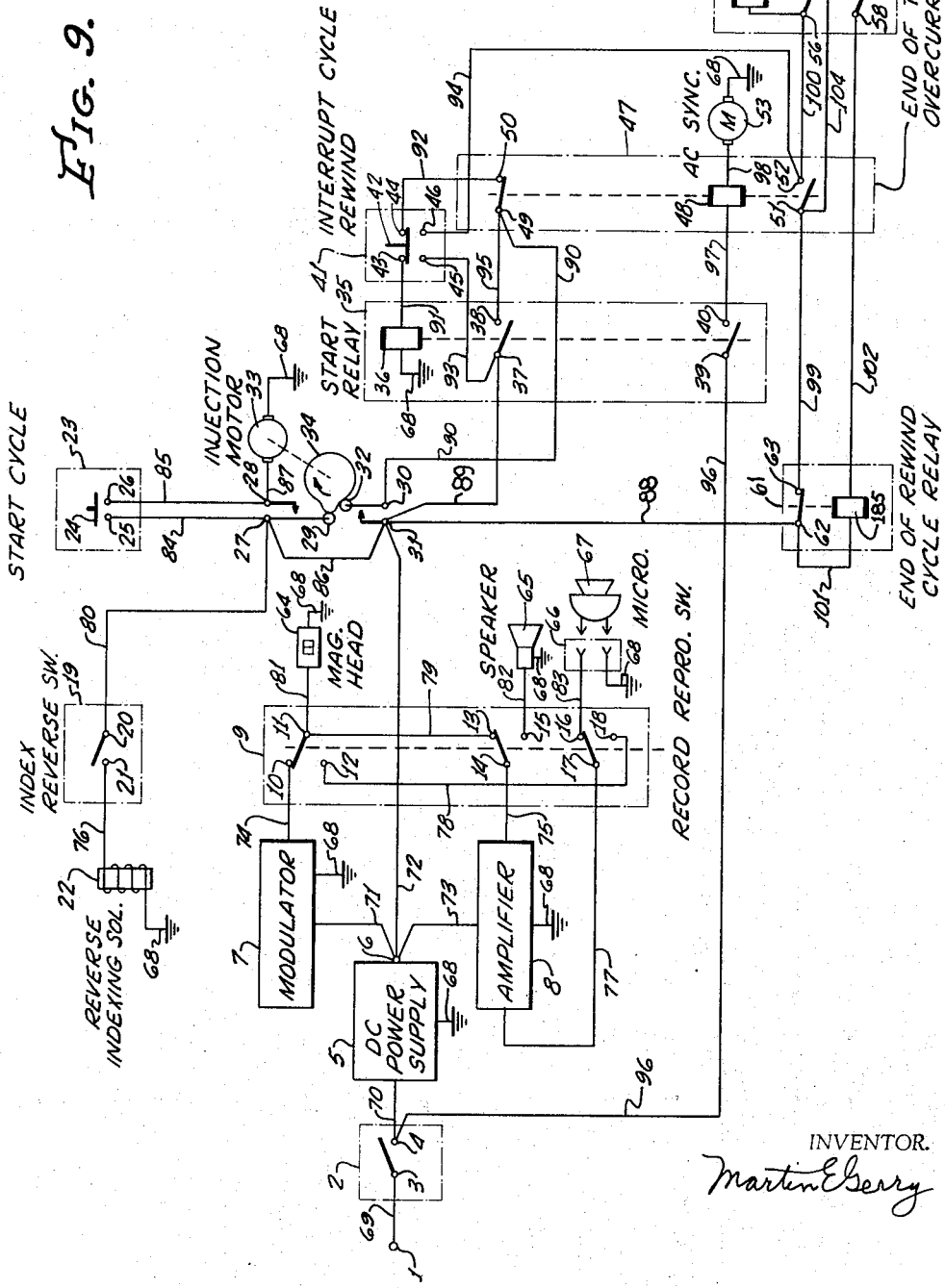

United States Patent Office 3,359,665
Patented Dec. 26, 1967

3,359,665
COMBINATION SOUND AND SLIDE PROJECTOR
Martin E. Gerry, 13452 Winthrope St.,
Santa Ana, Calif. 92705
Filed Apr. 20, 1965, Ser. No. 449,501
12 Claims. (Cl. 40—28.1)

The present invention relates to an improved projector for optically projecting a stationary slide and simultaneously reproducing or recording a sound track thereon.

A particular advantage of the present invention is that it includes a sound reproduction cartridge having long reproducing or recording time, occupying a small volume of space, and into which the slide is inserted and permanently held. Accordingly, the time delay between termination of one slide and the showing of another, is dependent only upon the substantially quick rewind of the magnetic tape or wire, and upon the speed which the slides and cartridges in which the slides are retained, may be withdrawn and replaced in a storage magazine. This slide-sound cartridge mechanism simplifies the structure of the present invention with the attendant advantage of lower cost, greater simplicity, and higher reliability.

Another feature of the present invention is a stationary record-reproduce head mechanism, mounted on a supporting plate so that the head mechanism adapts itself to the magnetic tape or magnetic wire cartridge for recording or reproducing a sound track. Other inventions have complex movable head assemblies that are expensive to manufacture, whereas this type of head mechanism is inexpensive to manufacture.

Another object of this invention is to combine an improved long time playing sound track with a slide which is completely independent of space orientation of the projector.

Still another object of the present invention is to provide a slide and sound projector having improved and simple means for completely and automatically withdrawing and replacing successive slides from a storage magazine.

A further object of the present invention is to provide a means for creating an inexpensive and simple automatic control mechanism, which will cause the projector to automatically rewind its sound track means when the terminal position of the tape or wire recording sound track means is reached, and to have the automatic control mechanism reset itself, when reset to await a recycle pulse to eject the used cartridge, inject a new cartridge, and to begin a new record-reproduce cycle.

A further object of the present invention is to provide an automatic control means for interrupting a sound record, automatically rewind the tape or wire, and automatically reset the control means.

Still a further object of the present invention is to provide a simple tape or wire spool drive or rewind coupling means, by using magnetically off-centered or unbalanced armatures in the reproduce and rewind motors, so that when electrical energy is applied to either of the motors, the motor shaft will move along its axis causing a pinion at the end of each motor shaft, or a fluted end of the motor shaft proper, to engage with the tape or wire spool, and when the electrical energy is removed from either of the motors, the motor armature or rotor will again assume its magnetically off-centered or unbalanced position.

Briefly, in accordance with a preferred form of the present invention, a combined slide and sound projector includes a sound reproduction system comprised of a single magetic record-reproduce head, mounted on a support plate and oriented so that the magnetic record-reproduce head gap is tangent to the magnetically coated tape material or wire which traverses between two spools located within a cartridge containing the combined slide and magnetic recording-reproducing material which is wound on the spools retained therein. One motor rotates the spool tape past the magnetic head gap, while another motor of opposite rotational direction rewinds the tape to its normal initiating position, when the tape has been exhausted.

A single motor may be used for reproducing and rewinding the spools within the cartridge, by having a motor repositioning means which positions the motor from the reproduce to the rewind position and vice versa, and motor direction of rotation also reverses when positioned from the reproduce to the rewind position.

A single motor may also be used for reproducing and rewinding two spools located on the same axis of rotation mounted on a common shaft in a cartridge, said spools juxtaposed each other, with rubber or similarly frictional characteristic material mechanically attached to the surfaces of the spools retaining the sound track means, and said surfaces facing each other when axially mounted on the same shaft, so that a fluted or friction type motor shaft makes contact with both spool surfaces, covered with said friction material, simultaneously thereby driving one spool in one direction and the other spool in the other direction, and reversing of motor direction when rewinding, to drive the spools in opposite directions as compared with directions of rotation during reproduce cycle.

Another advantageous feature of the preferred embodiment is its provision of a means for automatically stopping the sound reproduction at the end of each tape. This arresting means preferably includes an end of tape overcurrent relay in series with a reproduce drive motor, which is activated when larger than normal current flows in the motor, because, with power applied to the motor, the motor shaft is momentarily held by the tape or wire which is stationary and in tension. Holding of the motor shaft will prevent the motor from building up an internal counter-electromotive force, which occurs while rotating, and which opposes the voltage applied from the input power means, thereby preventing large currents from flowing. But with the motor held stationary, no counter-electromotive force is built up, and larger than normal currents flow. Similarly, at the end of the rewind cycle, the tape is also held in tension and the rewind motor rotor is held stationary by the sound track tape, causing higher than normal currents to flow through the end of rewind cycle relay, thereby momentarily activating this relay, and causing the control cycle mechanism to be enabled for recycling.

Still another feature of the preferred embodiment of this invention is means for automatically feeding the cartridges in sequence. A motor driven sound-slide cartridge injector assembly translates a cartridge within the projector to a cartridge carrier magazine, which magazine is then translated a predetermined distance by an index gear engaged with a rack. In this manner, when the sound-slide cartridge injector assembly is returned, it engages the sound-slide cartridge immediately adjacent to the one previously used. Means are also provided for selectively advancing the carrier magazine in forward or reverse directions thereby selectively varying the slide sequence. Means are also provided to hold the sound-slide cartridge rigidly during transport as well as during reproducing cycle, by providing a C-bar cartridge holder mechanism as part of the C-bar cartridge transporter, which spring loads the sound-slide cartridge at cartridge extension guide, and also provides a cartridge guide bracket against which the cartridge rests and is supported during the record-reproduce or rewind cycles. Means are also provided by a motor driven cam with a slidebar cam pivot pin and a slidebar, to couple the slidebar with the cam and the C-bar cartridge holder pivot extension pin with the other end of the slidebar, providing a simple injection or ejection of the sound-slide cartridge, when the motor driven cam is rotated due to the motor being electrically energized.

A more thorough understanding of the invention may be obtained by a study of the following detailed description taken in conjunction with the accompanying drawings in which:

FIGURE 1 is a perspective view, partially in cross-section, of a combination sound and slide projector constructed in accordance with this invention;

FIGURE 2 is a top view partially in cross-section, showing the sound-slide cartridge transport mechanism, the cartridge carrier magazine and rack, the magnetic record-reproduce head assembly, a detailed cross-section view of the magnetically off-center drive motor construction, the rewind motor, the optical assembly, part of the cartridge carrier magazine indexing mechanism, and the reproduce cycle relay start cam-activated switches;

FIGURE 3 is a front view partially in cross-section, showing the drive motor for the sound-slide injection mechanism, comprising the cam, the slidebar, and the C-bar tension cartridge holder, the sound-slide cartridge both in injected and in magazine stored positions, and the indexing mechanism together with the double index gear;

FIGURE 4 is a cross-sectional view taken along line 4—4 of FIGURE 3, showing planned details of the indexing mechanism and its relationship to the index plate hammer prior to indexing action and cooperation between hammer and index plate. This figure displays the ready condition for forward indexing motion of the cartridge carrier magazine;

FIGURE 5 is a perspective view partially cut away and in cross-section, of the right end of the C-bar cartridge transporter, displaying in detail the spring loaded C-clamp cartridge guide extension holder, and showing the indexing hammer;

FIGURE 6 is a perspective view partially cut away and in cross section of the sound-slide cartridge, displaying the details of the internal construction of the cartridge including the spools which are retained in recessed depressions and which retain the sound reproducing tape or wire thereon, and showing the manner of assembly of the slide into the cartridge and the assembly of the cover with the cartridge case;

FIGURE 7 is a cross-sectional view taken along line 7—7 of FIGURE 3, showing an assembled sound-slide cartridge, and detailing the manner in which the spool is retained and held within the cartridge, and the spool keyway and cover aperture showing the access of the motor drive shaft with keyed end to the spool keyway;

FIGURE 8 is a partial perspective view, partially in cross-section of the spool, showing the manner in which the tape or wire is retained and held by the slotted portion of the spool by wedging of the tape or wire into the slot;

FIGURE 9 is a circuit schematic of the control and record-reproduce circuitry of a sound and slide projector electrical connections, in connection with the sound and slide projector;

FIGURE 10 is a side view detail of the record-reproduce head and the front and rear head guide plates in relation to the sound-slide cartridge.

*Main chassis support structure.*—Referring to FIGS. 1, 2, 3, 4, and 5, sub-assembly mounting plate 106 is mechanically affixed by screws or by welding to the vertical portion of main chassis support structure 105. This sub-assembly mounting plate 106 is rigidly supported by vertical columns (not shown) between the horizontal planes of structure 105 and mounting plate 106. C-bar support plate 175 is parallel to the located under plate 106 in the horizontal plane, and is mechanically affixed to main chassis structure 105 by means of screws. Affixed by screws or other mechanical means to the vertical plane portion of support base 105, are loud speaker 65, record-reproduce drive motor 53, rewind recording means motor 60, and magnetic record-reproduce head assembly mounting 119. Affixed by screws or other mechanical means to the horizontal segment of main chassis support structure, are brackets 115 and 116, and injection motor 33. The upper portion of the vertical members of the main chassis support structure 105 is split at the top and has two 90 degree bends which comprise a forward-reverse guide channel for sound-slide cartridge carrier magazine 122.

*Sub-assembly mounting plate.*—Referring to FIGS. 1 and 2, sub-assembly mounting plate 106 mechanically holds and retains by means of screws or other means, bracket 112, on which are mounted control switches 2, 9, and 19, push button switches 23 and 41, and microphone jack 66. Also held mechanically to sub-assembly mounting plate 106, are direct-current power supply 5, modulator 7, amplifier 8, start relay 35, end of tape overcurrent relay 47, rewind cycle relay 54, end of rewind cycle relay 61, sound-slide cartridge guide and optical assembly mounting bracket 114 to which is mounted and mechanically affixed optical assembly 117, sound-slide cartridge guide bracket 113, slidebar pivot pin 110, double index gear 128 held mechanically by screw 129, ball bearing index gear detent 130, cartridge carrier magazine 122, and indexing plate suspension screws 131 which mechanically hold index plate 146 and are free to move in slots 132 of guide blocks 178 welded to the underchassis of sub-assembly mounting plate 106. Index plate 146 has index plate guide pins 147 extending through index plate retract springs 148 and extending into holes provided in the vertical member of sub-assembly mounting plate 106. Reverse indexing solenoid 22 is suspended by screws 152 located in slots 153 of sub-assembly mounting plate 106. Double index gear 128, the lower segment mounted under the chassis of sub-assembly mounting plate 106 and extension of said lower segment of gear 128 extends through a hole in said mounting plate 106 to coaxially fit with the upper segment of said gear 128 inserted through the hole and located on the upper chassis of said plate 106, and said upper and lower segments of gear 128 are both held together on said plate 106 by screw 129. Cartridge carrier magazine 122 rides on the upper surface of sub-assembly mounting plate 106 in grooves 126. Said magazine 122 has a rack 127 mechanically attached to its side, said rack 127 engages with gear 128 for forward or reverse indexing. Said magazine 122 retains sound-slide cartridges 118. Cartridge extension 161 extends through slot 125 when said cartridge 118 is injected into position directly behind the optical assembly 117, and cartridges 118 extend through slots 124 at the base of magazine 122 and are situated between each of magazine divider panels 123.

*Cycle programming means.*—Referring to FIGS. 1, 2, and 3, an injector motor contact control switch comprised of moving contact element 27 and stationary contact element 28 are insulated from bracket 116 by an insulating strip 139 affixed to bracket 116 by mounting screws or like means which hold moving contact element 27 and stationary contact element 28 firmly affixed to aforementioned insulating strip which in turn is held attached to bracket 116. Insulating roller 29 mechanically attached to the tip of moving contact element 27 cooperates with the extended or high portion of injector motor programming cam 34 at the beginning of the cartridge injection cycle. Cam 34 is mechanically held by a set screw to shaft 107 of injector motor 33. Both bracket 116 and casing of motor 33 are mechanically held by screws fastened to horizontal member of main chassis support structure 105.

A start relay momentary enable and control switch is comprised of moving contact element 30 and stationary contact element 31 insulated from bracket 115 by an insulating strip 140 affixed to bracket 115 by mounting screws or like means. Mounting screws also hold contact elements 30 and 31 respectively to the insulating strip 140, which in turn is held attached to bracket 115. Connecting terminals for electrical connections are provided for contact elements 30 and 31 to the control circuit hereinafter described. Start relay momentary contact control switch insulating roller 32 situated at the top of moving contact 30 cooperates with cam 34 hereinabove described, and towards the end of each of sound-slide cartridge injection cycle, when the cam has almost substantially completed 360 degrees of clockwise rotation, the extended or high portion of cam 34 cooperating with insulating roller 32, causes cooperation and mechanical contact to be made substantially momentarily between movable contact 30 and stationary contact 31 to electrically energize start relay 35 (FIG. 9) hereinafter described. Bracket 115 is mechanically held by screws fastened to the horizontal member of main chassis support structure 105.

Cam 34 also includes a slidebar pivot guide 109, extended from and mechanically screwed into side of cam 34. The slidebar pivot guide 109 is inserted in slidebar cam slot 141 of slidebar 108 so as to cooperate with said slidebar cam slot 141 and guide slidebar 108 during the sound-slide cartridge injection cycle.

*Forward-reverse cartridge indexing mechanism.*—Referring to FIGS. 1, 2, 3, and 4, slots 126 are used to guide cartridge carrier magazine 122 and provide alignment with index gear 128 forming part of a forward-reverse record indexing mechanism whose component parts are mounted on sub-assembly mounting plate 106 and index plate 146. The teeth of gear 128 engage with cartridge carrier index gearing rack 127 to move cartridge carrier magazine 122 forward or backward dependent on direction of motion of index gear 128, which in turn is dependent on the position of forward-reverse indexing mechanism. Index plate guide pins 147, are inserted through index plate return springs 148 into holes in vertical member of sub-assembly mounting plate 106 to provide normal repositioning of index plate 146. Index gear 128 is a two-part gear, of which the sleeve extension of the lower gear segment is inserted through a hole provided in sub-assembly mounting plate 106 and the upper portion of gear 128 coaxially assembled with the sleeve extension of the segment of gear 128 and mechanically held to each other by means of index gear mounting screw 129. Welded to the underchassis of sub-assembly mounting plate 106 are guide blocks 178 used for guiding index plate 146 by means of screws 131, and for freedom of motion of index plate 146 when cooperation with hammer 145, or when energizing solenoid 22. Index block 130 retaining a ball bearing detent which cooperates with the teeth of index gear 128 to provide a detent action is mounted and mechanically affixed to sub-assembly mounting plate 106.

Index plate 146 also supports a set of pawls 149 and 150 mounted on index plate 146 by means of pawl mounting pivot pins 162, so that these pawls can freely rotate thereon. Pawl return springs 151 respectively engage the pawls at one end and are held at the other end by spring retention holes in index plate 146 so that when index plate 146 is moved to the right, either pawl 149 or pawl 150 (whichever is then engaged with index gear 128), the leading edge of the pawl cooperates with gear teeth 128 to rotate index gear 128 through one tooth position. Pawl 149 or 150 is then returned to its normal position by spring action of pawl return spring 151 pulling on said pawl enabling the pawl to skirt by the gear teeth of index gear 128.

Pawl 149, shown as engaging gear 128 is set for operating or moving cartridge carrier magazine 122 in a forward direction. The disengaged pawl 150 is used for reversing the cartridge carrier magazine 122 when said pawl 150 is engaged in a cooperative position with gear teeth of index gear 128, which occurs when solenoid 22 is energized. The indexing mechanism is then moved to the forward position in indexing slots 132 by solenoid plunger retraction into solenoid 22. Solenoid 22 is mechanically coupled via index plate holding bracket 155 and retaining screw 156, to index plate 146. The shaft of solenoid 22 retains solenoid retract spring 154 which normally forces index plate 146 to its normal forward feeding cartridge carrier magazine position due to solenoid 22 being normally deenergized. Solenoid 22 is mounted by means of solenoid suspension screws 152 threaded into holes in the solenoid suspension bracket which is brazed or otherwise mechanically affixed to the frame of solenoid 22. These screws 152 extend through the free motion slots 153. The U-shaped index slots 132 in sub-assembly mounting plate 106 have extended through them screws 131 which extend through blocks 178 with similar U-shaped slots, and are threaded into holes of the index plate 146 to suspend index plate 146 and permit free motion thereof. The operation of the forward-reverse indexing mechanism is as follows:

When the C-bar cartridge transporter is translated to the right, the index plate hammer 145 of the C-bar cartridge transporter moves to engage the vertical plane member of index plate 146 causing index plate 146 to translate to the right. If solenoid 22 is deenergized, pawl 149 will engage gear tooth of index gear 128 due to motion of index plate 146 to move the cartridge carrier magazine 122 forward. Or, if solenoid 22 is energized, pawl 150 is engaged and cooperating with gear tooth of index gear 128 to move the cartridge carrier magazine 122 in a reverse direction. The FIGURES 1, 2, 3 and 4 show screws 131 positioned during the normally deenergized state of solenoid 22 or forward motion position of cartridge carrier magazine 122. In the energized state of solenoid 22, the shaft of solenoid 22 will be retracted and screws 131 will be positioned in the other segment of slots 132, thereby causing the indexing mechanism to engage pawl 150 with tooth of index gear 128 and rotate the index gear so as to reverse motion of cartridge carrier magazine 122.

*Sound-slide cartridge transporting, positioning and registration means.*—Referring to FIGS. 1, 2, 3, 4, 5, 6, 7, and 8, C-bar support plate 175 is mounted in the horizontal plane and mechanically affixed by screws to the vertical portion of main chassis support structure 105. Mounted thereon are C-bar guide bracket 176 which prevents rotation of sound-slide cartridge 118 when it is being transported into cartridge carrier magazine 122. Mechanically affixed by adhesive material or other mechanical means to bracket 176 is Teflon bearing strip 184 used for smooth translation of C-bar cartridge transporter 143. Slot 177 is common to both C-bar guide bracket 176 and Teflon strip 184, through which slot 177 projects C-bar pivot pin 111 for proper guidance of C-bar 143 by slidebar 108 from its injected position to its translated position into magazine 122 and thence returned to its injected position with the next indexed cartridge 118. Slidebar 108 is suspended from sub-assembly mounting plate 106 by pivot pin 110 and engaged cooperatively with slidebar pivot guide 109 of cam 34 in slot 141 on one end of the slidebar 108, and engaged cooperatively with pivot pin 111 of C-bar 143 in slot 142 on the other end of the slidebar 108, said slidebar 108 pivots about pin 110 due to clockwise rotation of cam 34 which is coupled to shaft 107 of motor 33, being rotated due to the fact that motor 33 had been electrically energized, thereby translating sound-slide cartridge 118 from its position directly at the rear of the optical assembly 117 to its retaining section between cartridge carrier magazine dividing panels 123 within sound-slide cartridge carrier magazine 122. Translatory motion of sound-slide cartridge 118 together with translatory motion of C-bar 143, will result in sound-slide cartridge guide extension 161 being moved from slot 125 to slot 124 upon completion of 180 degree rotation of cam 34, because hammer 145 will at substantially completion of 180 degrees of cam 34 rotation, move the index plate 146 to the right and thereby due to either pawl 149 or pawl 150 cooperating with a tooth of index gear 128, rotating said index gear 128 counterclockwise or clockwise, which will advance or reverse cartridge carrier magazine 122 to its next indexed position, causing end clamps ridged inserts 158 held in tension by spring 159 in channels 157 to cause C-bar cartridge tension assemblies 144 located on both ends of C-bar cartridge transporter 143, to release the transported sound-slide cartridge 118 and engage the next indexed sound-slide cartridge 118 which upon completion of 360 degrees rotation of cam 34, the next sound-slide cartridge 118 will be injected into exact position of axial alignment and registration of shafts of motors 53 and 60 with apertures 174 and keyways 170 for record-reproduce or rewind action in accordance with the programmed control cycle to be hereinafter described. Cam 34 stops because motor 33 is electrically deenergized be contact 27 ceasing to cooperate with contact 28 due to roller 29 cooperating with the high point cam 34.

*Integration of sound means with visual means in a single long playing cartridge.*—Referring to FIGS. 6, 7, and 8, means are provided for integration of long recording or reproducing of sound integrated with a slide in a compact and simple integrated sound-slide cartridge 118. The cartridge consists of a plastic or other material spool retainer case 164 having as an integral part of this case inserts 173 for mechanically affixing therein a cover 165 with two apertures 174, by means of screws 179. (Only a section of cover 165 is shown.) Also, as an integral part of case 164 is cartridge guide extension 161 used for guiding and translating cartridge 118 by suitable means described in this specification. Mounted in each of the two recesses 166 is projection 167 of spools 163 on which are wound magnetic tape or wire 169. The ends of magnetic tape or wire 169 are friction held by slots 168 in which tape or wire ends are inserted, or are held in slots 169 by means of fillets mechanically affixed to the ends of tape 169 and inserted into slots 168 (fillets not shown). Tape or wire 169 is threaded through two slots or apertures at the top of spool retainer case 164 prior to inserting ends of tape or wire into their respective slots of the left and right spools. Each of tape or wire spool 163 has a fluted or notched keyway 170, axially aligned with cover apertures 174 for admission of record-reproduce or rewind motor pinions or fluted shafts, the keyways are structured so as to exactly fit with the pinions or with the fluted shafts. The quantity of tape or wire that may be stored on a spool is large enough to enable the recording or reproducing of approximately one-half to one hour of sound in substantially small amount of space. Groove 171 is provided in a substantially square or rectangular window of spool retainer case 164 for insertion of a photographic or other slide 160 in the direction indicated on FIG. 6. Slide retainer panel 172 is inserted into a horizontal groove at the bottom of the window of spool retainer case 164 in direction shown in FIG. 6 thereby retaining slide 160 securely in the window of case 164. Assembling the parts as hereinabove described results in the integrated sound-slide cartridge 118.

Other means of integration of sound means with visual means in a single long playing cartridge are not shown in any of the figures but are described as follows:

Means are provided for integration of long recording or reproducing of sound integrated with a slide in a single compact, and simple integrated sound-slide cartridge similar to cartridge 118 but which has its window mounted on one side of the cartridge instead of being located between the two spools similar to spools 163 in the same plane as said spools. The spools have rubber or other friction material mechanically affixed to their outer surfaces, and the spools are aligned so that their outer surfaces with the rubber or friction material face each other, and said spools are mounted on the same axis on a common shaft, said shaft having coaxially mounted a separator washer at its exact center for spacing of said spool faces, and said common spool mounting shaft extending through the axis of rotation of the spools and into mounting holes in case and cover of said integrated cartridge. The tape or wire 169 is extended through slots or apertures in said cartridge, external to said cartridge, but said slots or apertures are at an angle as compared with the slots shown in FIG. 6; the said tape or wire is held at its ends by slots similar to slots 168 of FIGURE 8. The tape or wire 169 being at an angle due to crossover from one spool to the other, necessitates mounting recording head assembly at the same angle in order to maintain alignment between tape or wire and face of record-reproduce head during tape or wire transport. In this arrangement only one motor is used to drive the sound reproduction means for reproducing and for rewinding, said motor, mounted on a bracket (not shown), whose shaft is orthogonal to the common mounting shaft of the two spools. The motor shaft is fluted at its end so that when injected between the two spool surfaces through an aperture in the cartridge case, will make frictional contact with both of the rubber or friction material mounted on the faces of said spools, and said motor shaft drives one spool clockwise and the other spool counterclockwise, and when rewinding the motor shaft rotation is reversed by an automatic control means, reversing the direction of rotation of said spools so that the said other spool is driven clockwise and the said one spool is driven counterclockwise. The window for the slide 160 now situated on one side of the cartridge but in the same plane as the said spool faces and the slide is inserted into grooves similar to grooves 171 and is held securely by slide retainer panel similar to panel 172.

Still another means of integration of the sound means with visual means in a single long playing cartridge, involves the same cartridge as heretofore described and illustrated by FIGS. 6, 7, and 8, but with a single motor whose base cooperates with a rail (not shown), which in turn is mechanically mounted on the vertical member of main chassis 105. The motor is manually or automatically positioned from its record-reproduce position during the record-reproduce cycle to its rewind position at which time the motor rotation direction is reversed for rewinding of said tape or wire 169 during the rewind cycle. In this case only one of the two motors 53 or 60 is used for both recording-reproducing or rewinding of said tape or wire 169 on said spools 163. This motor is positioned so that its shaft is alternately axially aligned with the record-reproduce and then with the rewind spool keyways 170.

*Overall operation of sound reproduction means.*—as shown in FIGS. 1, 2, 6, 7, 8, and 10, electrical motors 53 and 60 are mechanically affixed by their motor casings 135 to the vertical plane section of main chassis support structure 105. These motors each have stationary fields 183 and armatures 136, which have end positioning bushings 137, shafts 133, and pinions 134 mounted on the axes of rotation of armatures 136. When no electrical energy is applied to motors 53 or 60, the armatures or rotors are positioned as shown, towards the extreme rear of the motor casings 135, providing spaces 138 between the front bushings 137 and motor casings 135. These motors are purposely designed to be magnetically unbalanced in the electrically deenergized positions favoring the mechanical relationships above described. But when motors are electrically energized the armatures will move along and about the axes of shafts 113 in motor cases 135 to find their magnetic centers, closing the gaps 138 between the front bushings 137 and motor casings 135, thereby causing pinions 134 to move through apertures 174 of sound-slide cartridge 118, engaging keyways 170 at the axes of magnetic tape or wire spools 163, to rotate such spools in a clockwise direction by motor 53 for recording or reproducing sound, or in a counterclockwise direction by motor 60 for rewinding magnetic tape or wire 169.

Magnetic tape or wire 169 is held by frictional contact between tape or wire 169 and slots 168, or by fillet stops at the ends of tape or wire 169 wedged in slots 168 of each of spools 163. Projections 167 are seated in sound-slide cartridge case recesses 166. Spool retainer case cover 165 is mechanically held to sound-slide cartridge case 118 by screws 179 inserted into tapped inserts 173.

When record-reproduce motor 53 is energized, and as above described spools 163 are rotating in a clockwise direction, or when rewind motor 60 is energized and as above described, spools 163 are rotating in a counter-clockwise direction, magnetic tape or wire cooperates with the gap of magnetic head 64, moving tangentially to the face of and across the gap of magnetic head 64. Magnetic head 64 is mechanically affixed to front guide plate 180 and to rear guide plate 181, both guide plates used for exact alignment of magnetic head gap with magnetic tape or wire transported within the sound-slide cartridge 118. Rear guide plate 181 is mechanically held to reproducing head mounting block 182. Reproducing head mounting block 182 is mechanically held by pivot pin 121 coaxially positioned within head tension spring 120, and both pivot pin 121 and spring 120 are used to mechanically join reproducing assembly mounting block 119 with head mounting block 182. Block 119 is mechanically attached to vertical section of main chassis support structure 105 by means of screws. Spring 120 exerts tension on head mounting block 182 so that when cartridge 181 is being inserted in position behind the optical assembly 117, reproducing head mounting block 182 is permitted to swivel upward and then return to be supported by the edges of the sound-slide cartridge 118 due to cooperation of plates 180 and 181 with the sound-slide cartridge 118.

Limit stop pin (not shown), is mechanically mounted to the lower surface of head mounting block 182 which cooperates with and wedges against lower surface of reproducing assembly mounting block 119 to substantially prevent spring 120 from swiveling block 182 below its normal reproducing position, when during transport of sound-slide cartridge 118, said sound-slide cartridge 118 is not always cooperating with guide plates 180 and 181.

*Means for arresting sound reproduction assembly.*—FIGURES 1, 2, 3, 5, and 6 further illustrate the means for arresting sound reproduction or rewinding assembly when tape or wire 169 is exhausted from either of the spools 163, or at any time during the record-reproduce cycle prior to tape or wire 169 being exhausted from either of spools 163. When it is desired to stop recording or reproducing prior to tape or wire 169 being exhausted from spool 163, interrupt cycle rewind push button 41 is momentarily manually depressed, causing movable contactor 42 to cease cooperating with stationary contacts 43 and 44 thereby deenergizing start relay coil 36 of relay 35, which in turn causes contacts 39 and 40 of relay 35 to be released and to cease cooperating with each other, disconnecting power means from coil 48 of relay 47 which stops motor 53 thereby stopping motion of tape or wire 169 and arresting the sound reproduction assembly; movable 42 also cooperates momentarily with stationary contacts 45 and 46 directly after ceasing cooperation with contacts 43 and 44, all of push button switch 41, thereby applying electrical power to coil 55 of rewind cycle relay 54, energizing relay 54 which pulls movable contact 56 to a cooperating position with stationary contact 57 causing relay 54 to remain energized. The energized relay 54 causes contacts 58 and 59 to cooperate with each other which energizes tape rewind motor 60. Said motor 60 will then stop when tape or wire 169 is exhausted due to the fact that a higher than normal current will flow in the tape rewind motor 60 and hence in coil 185 of end of rewind cycle relay 61, momentarily operating said relay 61 and causing contacts 62 and 63 of relay 61 to momentarily cease cooperating thereby momentarily removing power from coil 55 of rewind cycle relay 54, deenergizing relay 54 which causes contacts 58 and 59 to cease to cooperate with each other, thereby removing power from tape rewind motor 60 and causing motor 60 to stop, wherefore the sound reproduction assembly is reset ready for recycling. The magnetic center unbalance of rotors of motors 53 or 60 as heretofore discussed, causes their motor shafts with pinions attached thereto, to retract from apertures 174 and keyways 170 whenever power is removed from said motors 53 or 60.

*Cartridge injection cycle.*—Referring to FIGS. 1, 2, 3, 4, 5, and 9, this cycle is started when start cycle push button 23 is manually depressed momentarily, starting motor 33 which rotates cam 34, mechanically attached to motor shaft 107, in a clockwise direction. Slidebar pivot guide 109 cooperates with and is inserted in slot 141 of slidebar 108, C-bar pivot pin 111 cooperates with and is inserted in slot 142 of said slidebar 108, and slidebar pivot pin 110, suspended by said sub-assembly mounting plate 106, translates said slidebar during rotation of cam 34, during the first 180 degrees of cam 34 rotation from slidebar 108 initial position wherein cartridge 118 is injected behind bracket and cartridge guide 114 to its translated position in compartment in magazine 122 between magazine divider panels 123, and during the next 180 degrees of cam 34 rotation, after indexing mechanism as hereinabove described has been moved thereby moving magazine 122 forward or backward so that a new cartridge 118 is engaged by C-bar assembly 143, returns said slidebar 108 to its initial position as above described. During the first 90 degree rotation of cam 34 C-bar pivot pin 111 will move from its position in slot 142 from the end of slot 142 near the end of slidebar 108 to its opposite end of slot 142, and slidebar pivot guide 109 initially situated approximately midway in slot 141 will move to the end of slot 141 in a direction nearest pivot 110, which action will transport cartridge 118 midway between its injected position behind bracket 114 and its stored position in magazine 122. During the next 90 degrees of cam 34 rotation, C-bar pivot pin 111 will move from its position at the end of slot 142 nearest pivot pin 110, to the end of slot 142 nearest the end of slidebar 108, and slidebar pivot guide 109 will move from the end of slot 141 back to its normal position approximately midway in said slot 141 as shown in FIG. 2, which action will transport cartridge 118 fully into magazine 122, cam 34 having completed 180 degrees of rotation. During the following 90 degrees of rotation of cam 34, C-bar pivot pin 111 will move from its position at the extreme end of slot 142 towards the end of slidebar 108 towards its opposite end within the same slot 142, and slidebar pivot guide 109 now situated approximately midway in slot 141 will move in said slot 141 in a direction towards the end of slidebar 108, which action will transport the newly engaged cartridge 118 from its location within magazine 122 to a point midway between said magazine 122 and its normally injected position behind bracket 114. During the last 90 degrees of cam 34 rotation, C-bar pivot pin 111 will move from its position at the extreme end of slot 142 nearest pivot pin 110 to its opposite end of slot 142 nearest the end of slidebar 108, and slidebar pivot guide 109 will move in slot 141 in a direction away from the end of slidebar 108 towards its normal initial position approximately midway in said slot 141 as shown in FIG. 2, which action will transport cartridge 118 to its injected position directly behind mounting bracket 114; the used cartridge 118 having been ejected and a new cartridge 118 having been injected, and cooperation of pivot guide 109 with slot 141 as well as cooperation of pivot pin 111 with slot 142 having occurred during the 360 degrees of cam 34 rotation. Stopping of cam 34 rotation is achieved by virtue of said cam 34 having moved contact 27 away from contact 28 by cooperation of the high point of cam 34 with roller 29, mechanically affixed to the tip of moving contact 27, so that contacts 28 and 27 no longer cooperate with each other thus electrically disconnecting power means from motor 33 and stopping rotation of said motor 33 and said cam 34 mounted on shaft of motor 33.

*Electrical circuit schematic.*—The automated transporter recorder-reproducer and rewinder control circuit is schematically shown in FIG. 9, and is comprised of alternating current power source means 1, and common return means 68 for alternating current power return, direct current power return, and record or reproduce electrical signal current return, all three returns being common to each other, and the direct current power return means is also the negative potential of said direct current power means. Alternating current power source means 1 is electrically connected by means of wire 69 to main alternating current power switch blade 3 of main alternating current power switch 2. Alternating current power input means terminal 4 of switch 2 is electrically connected by means of wire 70 to input terminal of alternating current to direct current power supply 5 and by means of wire 96 to contact 39 of relay 35.

Direct current positive power output terminal 6 of power supply 5 is electrically connected by means of wire 71 to modulator 7, by means of wire 73 to amplifier 8, and by means of wire 72 to contact 31 of the record cycle start switch. Direct current positive power is further distributed by electrical connection from contact 31 by means of wire 86 to contact 27 of injector motor switch, and from contact 27 electrically connected by means of wire 84 to contact 25 of start cycle push button 23. Contact 27 is also electrically connected by means of wire 80 to contact 20 of indexing reverse switch 19. Contact 21 of indexing reverse switch 19 is electrically connected by means of wire 76 to reverse indexing solenoid 22. Direct current positive power is further distributed by contact 31 being electrically connected by means of wire 88 to contact 62 and thence by means of wire 101 electrically connected to coil 185 of relay 61. Direct current positive power is further distributed by contact 31 which is electrically connected by means of wire 89 to contact 37 of start relay 35, from contact 37 electrically connected by means of wire 93 to contact 45 of interrupt cycle rewind push button 41.

Contact 26 of start cycle push button 23 is electrically connected by wire 85 to contact 28 of injection motor cycle switch. Contact 28 is also electrically connected by means of wire 87 to injection motor 33. Contact 30 of start relay momentary contact switch is electrically connected by means of wire 90 to contact 49 of end of tape overcurrent relay 47. Contact 49 is also electrically connected by means of wire 95 to contact 38 of start relay 35. Contact 40 of start relay 35 is electrically connected by means of wire 97 to coil 48 of end of tape overcurrent relay 47 and the other side of coil 48 is electrically connected by means of wire 98 to alternating current synchronous motor 53. Contact 50 of end of tape overcurrent relay 47 is electrically connected by means of wire 92 to contact 44 of interrupt cycle rewind push button 41. Contact 43 of interrupt cycle rewind push button 41 is electrically connected by means of wire 91 to coil 36 of start relay 35. Contact 46 of interrupt cycle rewind push button 41 is electrically connected by means of wire 94 to contact 52 of end of tape overcurrent relay 47. Contact 52 is also electrically connected by means of wire 100 to contact 56 and coil 55 both of rewind cycle relay 54. Contact 57 of rewind cycle relay 54 is electrically connected by means of wire 104 to contact 51 of end of tape overcurrent relay 47 and contact 51 is also electrically connected by means of wire 99 to contact 63 of end of rewind cycle relay 61. Coil 185 of end of rewind cycle relay 61 is electrically connected by means of wire 102 to contact 58 of rewind cycle relay 54. Contact 59 of rewind cycle relay 54 is electrically connected by means of wire 103 to tape or wire rewind motor 60.

Electrical signal output means of modulator 7 is electrically connected by means of wire 74 to contact 10 of record-reproduce switch 9. Electrical signal output means of amplifier 8 is electrically connected by means of wire 75 to contact 14 of record-reproduce switch 9. Contact 17 of record-reproduce switch 9 is electrically connected by means of wire 77 to electrical signal input means of amplifier 8. Contacts 11 and 13 of record-reproduce switch 9 are electrically connected to each other by means of wire 79, while contacts 12 and 18 of said switch 9 are electrically connected to each other by means of wire 78. Contact 11 of record-reproduce switch 9 is electrically connected by means of wire 81 to magnetic record-reproduce head 64. Contact 15 of record-reproduce switch 9 is electrically connected by means of wire 82 to loud speaker 65. Contact 16 of record-reproduce switch 9 is electrically connected by means of wire 83 to the signal input terminal of jack 66 whereas the signal input terminal of microphone 67 is electrically connected by cooperating with the signal input terminal of said jack 66. The signal return terminal of microphone 67 cooperates with and is electrically connected to the signal return terminal 68 of microphone jack 66. Other common signal return terminals 68 electrically provide common signal return means for loud speaker 65, record-reproduce head 64, modulator 7, and amplifier 8. Terminal 68 also provides a common direct and alternating current return means for alternating current conversion into direct current by power supply 5, record-reproduce synchronous drive motor 53, reverse indexing solenoid 22, cartridge injection motor 33, start relay coil 36, rewind cycle relay coil 55, and tape or wire rewind motor 60.

*Record-reproduce switch positions.*—Referring to FIG. 9 schematic, the record-reproduce switch 9 is shown in the record mode of operation. Under said record mode of operation switchblade 11 of switch 9 cooperates with contact 10 of switch 9 providing a carrier bias voltage output from modulator 7 to magnetic head 64, while microphone 67 inserted into and cooperating with jack 66 provides an audio or sound signal to contact 16 of switch 9, said contact 16 cooperating with switchblade 17 of switch 9 provides an audio signal input to amplifier 8 and said amplifier 8 output provides an amplifier audio signal to magnetic head 64 by virtue of switchblade 14 and contact 13 of switch 9 cooperating with each other and contact 13 being electrically connected to switchblade 11, thereby providing an audio signal modulated or biased by a carrier voltage simultaneously to magnetic head 64 and causing sound to be magnetically applied to a magnetic tape or wire by magnetic head 64 and causing recording to take place when alternating current power is applied to record-reproduce circuit by manually closing switch 2 and momentarily manually depressing start cycle push button 23.

When the record-reproduce switch 9 is manually operated so that the switch 9 is in the reproduce mode of operation (switch positions opposite to those shown in FIG. 9), switchblade 11 will cooperate with contact 12, switchblade 14 will cooperate with contact 15, and switchblade 17 will cooperate with contact 18, (all are switchblades and contacts of switch 9), the modulator 7 will be electrically disconnected and the magnetic head 64 will be electrically connected through wires 81, 78, and 77 to the input of amplifier 8, and the output of amplifier 8 will be electrically connected through wires 75 and 82 to loud speaker 65 for reproduction of sound previously recorded on the aforementioned tape or wire, when alternating current power is applied to circuit and start cycle push button is momentarily manually depressed.

*Cooperation of component parts prior to circuit operation.*—Referring to FIG. 9, the schematic shows the normal pre-operative mode of the control circuit components. Excepting for record-reproduce switch 9 hereinabove described, roller 29 attached to the tip of moving contact 27 of the injection cycle switch, cooperates with the extended or high portion of cam 34 and thereby contact 27 will cooperate with contact 28 at substantially most of the 360 degrees of cam 34 rotation excepting when the high point of cam 34 cooperates with roller 29; roller 32 attached to the tip of movable contact 30 and cooperating with cam 34 will cooperate with contact 31 of the start recording cycle momentary switch only during a very small fraction of the cam 34 rotation, said cam 34 rotating clockwise will cause its extended or high portion to move contact 30 so it momentarily cooperates with contact 31, near the completion of the 360 degrees of cam 34 rotation, thereby causing direct current power to be momentarily applied to coil 36 of start relay 35 through wires 90, cooperation contacts 49 and 50 of relay 47, wire 92, cooperating contacts 44, 43, and 42 of interrupt cycle rewind push button 41, and wire 91. Cooperating contacts 62 and 63 of end of rewind cycle relay 61 provide a direct current power means, to wires 72, 88, 99 and 104 to contact 51 of end of tape overcurrent relay 47 and to contact 57 of rewind cycle relay 54. Alternating current synchronous motor 53 is substantially slow in starting, so that when it is electrically energized by virtue of pull-in action of armature of start relay 35 which causes contacts 39 and 40 of relay 35 to cooperate with each other and apply alternating current power through coil 48 of relay 47 to said motor 53, cam 34 had come to a complete stop after its 360 degree rotation, and cartridge injection had by this time already been completed.

As described in this specification, the indexing mechanism is normally positioned for activating forward motion of cartridge carrier magazine 122 with solenoid 22 normally electrically deenergized. When reverse or backward motor of cartridge carrier magazine 122 is desired, index reverse switch 19 is manually moved to the position which causes contacts 20 and 21 to cooperate with each other thereby causing direct current power to be applied to reverse indexing solenoid 22 which causes solenoid shaft mechanically coupled to index plate 146, to retract into solenoid 22 case compressing spring 154, positioning index plate 146 so that index plate suspension screws 131 are in the forward segments of slots 132 and reverse indexing pawl cooperates with teeth of index gear 128 for reverse direction translation of cartridge carrier magazine 122 as previously described in this specification.

*Control circuit operation sequence and interrupt cycle rewind sequence.*—Referring to FIGURE 9, with the recor-reproduce switch 9 in either the record or reproduce position thereby electrically connecting the record or reproduce components as heretofore described, main alternating current power switch 2 is closed so that contact 3 cooperates with contact 4 which provides alternating current power from alternating current power source means 1 to power supply 5 and to contact 39 of start relay 35. Start cycle push button 23 is then momentarily manually depressed causing contactor 24 to momentarily cooperate with contacts 25 and 26, which causes injection motor 33 to be electrically energized starting clockwise rotation of cam 34 mechanically affixed to shaft of said motor 33, thereby causing roller 29 to cease cooperating with the high point of cam 34 and causing movable contact 27 attached to roller 29 to cooperate with contact 28 thereby applying electrical power to said motor 33 for the duration of the 360 degrees of cam 34 rotation (until the high point of cam 34 again disconnects or pulls apart the cooperating contacts 27 and 28). At substantially completion of cam 34 rotation, direct current power is momentarily applied to coil 36 of start relay 35 thereby causing contacts 37 and 38 to cooperate with each other and causing contacts 39 and 40 to cooperate with each other. Contacts 37 and 38 are holding contacts which hold the start relay coil 36 electrically energized for the duration of the record-reproduce cycle except when said cycle is purposely interrupted by manually momentarily depressing push button 41, wherein contacts 39 and 40 cease to cooperate and remove alternating current power applied through coil 48 of relay 47 from record-reproduce tape or wire transport motor 53; momentary application of direct current power to above described coil 36 occurs during rotation of cam 34 when the high point of cam 34 causes cooperation of contacts 30 and 31 momentarily.

Motor 53 continues to transport tape or wire 169 (FIGS. 1, 2, and 3), until said tape or wire has been exhausted from the record-reproduce spool thereby mechanically stopping shaft 133 of motor 53 because tape or wire 169 is held in tension between the shaft of energized motor 53 and said tape or wire held mechanically in slot 168 of the other spool 163 (FIGS. 1, 6, and 8), thereby causing a higher than normal current to flow through motor 53, and coil 48 of end of tape overcurrent relay 47, which is electrically in series with said motor 53, and therefore relay 47 will be activated due to overcurrent flow in coil 48, thereby causing cooperating contacts 49 and 50 to cease to cooperate with each other thus removing direct current power from coil 36 of start relay 35, thereby deenergizing said relay 35, causing contact pair 37 and 38 to cease cooperating, and contact pair 39 and 40 as well as contact pair 37 and 38 to cease cooperating, removing power from motor 53 and thereby due to magnetic center unbalance of said motor 53, will cause its shaft and pinion to be retracted from aperture 174 and keyway 170, disengaging record-reproduce spool 163, and contact 51 will momentarily cooperate with contact 52 thereby momentarily applying direct current power to relay coil 55 of rewind cycle relay 54, thereby energizing said relay 54 and causing holding contacts 56 and 57 to cooperate with each other, thereby holding relay 54 energized as well as causing contacts 58 and 59 to cooperate with each other, thereby causing direct current power to be applied to tape rewind motor 60 in series with coil 185 of end of rewind cycle relay 61, thereby energizing said tape rewind motor 60, causing its shaft and pinion attached to the rotor of motor 60 to be inserted in aperture 174 and cooperate with spool keyway 170 due to said motor rotor seeking its magnetic center as heretofore described, and said motor shaft beginning to rotate, thereby rewinding tape or wire 169 on rewind spool 163.

When said rewind spool 163 rotated by tape rewind motor 60 exhausts the tape or wire 169 from record-reproduce take-up spool and fully translates and deposits tape or wire 169 on said rewind spool, thereby mechanically stopping shaft 133 of rewind motor 60 because tape or wire 169 is held in tension between shaft of electrically energized rewind motor 60 and mechanically held in slot 168 of the other spool 163, thereby causing a higher than normal current to flow through motor 60 and coil 185 of end of rewind cycle relay 61 which is electrically in series with said motor 60, therefore relay 61 will be activated due to overcurrent flow in its coil 185, thereby momentarily causing contacts 62 and 63 to cease cooperating with each other, momentarily removing direct current power from coil 55 of rewind cycle relay 54 causing holding contacts 56 and 57 and contacts 58 and 59 to cease cooperating with each other, thereby removing direct current power from tape rewind motor 60, and stopping same from rotating. Due to magnetic center unbalance of rotor of said motor 60, motor shaft and pinion will be withdrawn from aperture 174 and keyway 170 disengaging rewind spool and thereby ending the control sequence cycle, which may be started again by again manually momentarily depressing start cycle push button 23.

Stopping of recording or reproducing action and automatic rewind prior to complete exhaustion of tape or wire 169, is accomplished by momentarily manually depressing interrupt cycle rewind push button 41, after the control circuit had been put into operation by manually depressing start cycle push button 23. This action causes contactor 42 which is cooperating with contacts 43 and 44 to cease to cooperate with said contacts 43 and 44, thereby removing direct current electrical power from coil 36 of start relay 35, which causes holding contacts 37 and 38 to cease cooperating with each other, thereby deenergizing and releasing the hold on relay coil 36 causing contacts 39 and 40 to cease cooperating with each other, thereby removing alternating current power from motor 53 which drives the spool taking-up tape or wire 169 during recording or reproducing, and causes said motor 53 to stop and retract its shaft with pinion mounted thereon from the spool keyway 170 and aperture 174 due to magnetic center unbalance of said motor 53 as heretofore described. Contactor 42 substantially simultaneously also cooperates momentarily with contacts 45 and 46, thereby momentarily applying direct current power to coil 55 of rewind cycle relay 54, momentarily energizing said relay 54 and causing its holding contacts 56 and 57 to cooperate with each other thereby maintaining said relay 54 in the energized state, causing contacts 58 and 59 to cooperate with each other and applying direct current power to tape rewind motor 60 in series with coil 185 of end of cycle rewind relay 61. Shaft of motor 60 with pinion mounted thereon, engages the tape or wire rewind spool 163 in a manner hereinabove described, thereby rewinding said tape or wire 169 to its initial starting position, at which time end of tape or wire inserted and mechanically or friction held in tension in slot 168 of spool 163 and by the rewound tape or wire now stored on the rewind spool, holds shaft of rewind motor 60, preventing its rotation which causes a greater than normal current to flow through said motor 60 and coil 185 of relay 61, which causes relay 61 to be activated and contacts 62 and 63 of said relay 61 to momentarily cease to cooperate with each other, thereby momentarily removing direct current power from coil 55 of relay 54, thereby deenergizing rewind cycle relay 54, and causing cooperating holding contacts 56 and 57 of relay 54 to cease cooperating with each other, and also causing cooperating contacts 58 and 59 to cease cooperating with each other thereby removing direct current power from rewind motor 60 and causing said motor 60 to stop rotating and to retract its shaft with pinion from spool keyway 170 and aperture 174, due to its magnetic center unbalance as hereinabove described, thereby ending the rewind cycle sequence. The control circuit sequence may now be again repeated by again manually momentarily depressing start cycle push button 23.

I claim:
1. In an apparatus for optically projecting visual information and recording and reproducing sound from a sound track, the combination of a sound track and slide cartridge, comprising:
 a cartridge case which comprises a window for retaining a slide and a pair of spools whose flanges are coplanar with each other and coplanar with the said window; and
 a sound track means retained by said pair of spools; and
 recesses which retain said pair of spools; and
 grooves in said window for aligning the said slide parallel to said window aperture; and
 a panel, inserted in grooves orthogonal to the slide aligning grooves, for retaining the said slide in the said window; and
 a cover for said cartridge case with two apertures on the same axes as the axes of the said spools and with cover fastening holes at its periphery for mechanically securing cover with pins to inserts which inserts are integral parts of the said cartridge case; and
 keyways at each axis of each of said pair of spools for insertion of keyed drive shafts; and
 a holding means, at each of said pair of spools.

2. The cartridge in claim 1, in combination with:
 a support structure registered in part with respect to said cartridge; and
 a pivot, for angular pivoting of part of said support structure with respect to said cartridge during said cartridge injection into said apparatus; and
 a spring tension mechanism, coaxial with pivot pin of said support structure to reposition part of said support structure with respect to said cartridge case; and
 a pivoting rotation restraining means, for limiting said part of support structure angular displacement; and
 guide plates, for registration and alignment of said part of support structure with said cartridge; and
 a pair of magnetically unbalanced rotors of electrical motors, for ejecting and injecting their respective keyed shafts from and into apertures and keyways of the said cartridge cover and the said pair of spools.

3. The sound and slide cartridge as in claim 1, in combination with,
 an automatic control means, which automatically controls the record-reproduce cycle and which is initiated by manually depressing a push button, whereby:
  the used cartridge is automatically ejected and a new cartridge is automatically injected; and
  sound recording-reproduction is automatically started; and
  the record-reproduce drive means is automatically stopped; and
  the rewind drive means is automatically started and the said rewind drive means is automatically stopped; and
  the said apparatus is automatically reset for repetition of the automatic control cycle.

4. In the automatic control means in claim 3, having a cycle interrupt means, whereby:
 a push button, momentarily manually depressed for automatically stopping the record-reproduce drive means; and
 for automatically stopping the said rewind drive means; and
 for automatically stopping the said rewind means; and
 for automatically resetting the said apparatus.

5. The automatic control means in claim 3, having an overcurrent control means, wherein:
 the record-reproduce drive means is automatically stopped due to tension exerted thereon by one of said spools which prevents rotation of said record-reproduce drive means, creating an overcurrent in said record-reproduce drive means and activating a control means which is in series said record-reproduce drive means, automatically stopping the said record-reproduce drive means, and automatically transfering control to the rewind drive means; and
 the said rewind drive means is automatically stopped due to tension exerted by the other of the said spools which prevents rotation of the said rewind drive means, creating an overcurrent in said rewind drive means and automatically activating a control means which is in series with the said rewind drive means, which automatically removes power means from the said automatic control means, and automatically resets the said automatic control means.

6. The apparatus in claim 2, wherein:
 a pair of guide plates, which register and align the part of said support structure with the said cartridge; and
 one of the guide plates is arc-shaped, to prevent mechanical interference between the said support structure and the said cartridge during injection and ejection of said cartridge into said apparatus.

7. In an apparatus for optically projecting visual information and recording and reproducing sound from a sound track, the combination of a sound and slide cartrige, comprising:
 a window for inserting a slide located in one portion of the said cartridge; and
 a pair of spools with friction type material mechanically affixed to the outer surfaces of their flanges, and located in another portion of the said cartridge; and
 the said outer surfaces with friction material mechanically affixed thereon face each other; and
 the axis of the said spools is the same axis; and
 the said spools are mounted on a common shaft, which shaft is coaxial with and has mounted a separator means at its center for providing fixed spacing between said spools; and said shaft extends through the common axis about which the said spools rotate, into oppositely displaced mounting apertures in said cartridge case and cover; and an aperture in said cartridge case, for inserting a friction type motor shaft in a direction orthogonal to the common axis of said both spools, said shaft cooperating with the friction type surfaces on the said spool flanges, and due to motor rotation action rotating said spools.

8. The apparatus in claim 1, wherein:
either of the said spools in the said cartridge is rotated about its axis of rotation by a single motor.

9. In an apparatus for optically projecting visual information and recording and reproducing sound from a sound track, the combination of
a cartridge retaining a slide inserted in a window of said cartridge; and
a sound track means on two spools; and
a cartridge guide extension at the base of said cartridge which is inserted in a guiding aperture in said apparatus and is engaged with and held by a cartridge transporting mechanism; and a cartridge transport assembly, comprising:
a cartridge holder and transporter means which has cartridge tension assemblies at either end of said cartridge holder and transporter means, and holds in tension said cartridge guide extension extended through the said guiding aperture in said apparatus; and a support plate with a bearing strip mechanically affixed thereto and having a guiding aperture in the combination support plate and bearing strip for support and for translation of cartridge holder and transporter; and a pivot pin of said cartridge holder and transporter, which extends through said guiding aperture of the combination support and bearing plate, and which is positioned at the center of said cartridge transporter and holder, and extends into and cooperates with one of two apertures of a slidebar; and said cartridge holder and transporter rests on and cooperates with said bearing strip surface; and said cartridge holder and transporter is automatically translated from its injected position within said apparatus into a cartridge carrier magazine and deposits the used cartridge therein and automatically returns with a new cartridge which is injected into position within said apparatus; and a cartridge extension acquisition mechanism, comprised of a channel retaining a spring and a ridged insert plate mechanically affixed to the end of said cartridge holder and transporter means; and an index plate hammer, mechanically affixed to one of the said cartridge extension acquisition mechanisms, for translating of indexing mechanism when said index plate hammer cooperates with said indexing mechanism; and a slidebar, which is suspended from a mounting plate by a pivot pin, said pivot pin is positioned at predetermined distances from the ends of said slidebar, and said slidebar has apertures at either end and pivoting pins are extended into and cooperate with both said apertures at both ends of the said slidebar, and said slidebar is automatically pivoted about its said pivot pin; and a cam, mechanically affixed to a motor shaft, the motor of which is in turn mechanically affixed to a supporting plate, and a pivot guide on said cam extends through and cooperates with the other of the two apertures of the said slidebar, and when power means is automatically applied and connected to said motor, said cartridge is automatically translated from its injected position in the said apparatus into a cartridge carrier magazine which retains a plurality of cartridges, and then another cartridge is automatically injected into said apparatus.

10. In the cartridge transport assembly in claim 9, where:
a high portion of said cam cooperating with one of a pair of contacts which comprises a switch; and
said switch contacts are held normally open and non-cooperating by the high portion of said cam, and when power is momentarily manually applied to the motor to which the cam is mechanically affixed, said cam is automatically rotated causing said normally open switch contacts to cooperate with each other thereby causing power means to be continually applied to said motor over a complete cam revolution period; and
said slidebar is automatically pivoted about a pivotal suspension, translating said cartridge from its injected position to its stored position in said cartridge carrier magazine, and thence automatically acquiring and transporting a new cartridge from said cartridge carrier magazine into the injected position within said apparatus.

11. In an apparatus as in claim 9, a cartridge transport assembly in combination with:
two mounting plates in the same plane, spaced a given distance apart, said given distance being substantially the same as the width of said cartridge guide extension; and
two grooves in said two mounting plates, for inserting guiding rails of a cartridge carrier magazine; and
said cartridge carrier magazine, which carries a plurality of cartridges and is supported during translation of said magazine by said guiding rails in said grooves; and
a means for automatically translating said magazine retaining said cartridges, in conjunction with the removal of a cartridge from said apparatus by said cartridge transport assembly, and returning said cartridge to the said magazine and then advancing the said magazine to the next cartridge position and inserting a new cartridge from the said cartridge carrier magazine into position in the said apparatus.

12. The cartridge holder and transporter means as in claim 9, having cartridge extension acquisition mechanism, mechanically affixed to an end of the said cartridge holder and transporter means.

References Cited
UNITED STATES PATENTS

| | | | |
|---|---|---|---|
| 3,029,683 | 4/1962 | Zaromb | 40—32 X |
| 3,176,580 | 4/1965 | Metz | 40—28.1 |
| 3,276,154 | 10/1966 | Harvey | 40—28.1 |
| 3,304,637 | 2/1967 | Tyndale | 40—28.1 |

EUGENE R. CAPOZIO, *Primary Examiner.*

W. J. CONTRERAS, *Assistant Examiner.*

UNITED STATES PATENT OFFICE
CERTIFICATE OF CORRECTION

Patent No. 3,359,665                      December 26, 1967

Martin E. Gerry

It is hereby certified that error appears in the above numbered patent requiring correction and that the said Letters Patent should read as corrected below.

Column 16, line 29, for "stopping" read -- starting --; line 40, after "series" insert -- with --.

Signed and sealed this 11th day of February 1969.

(SEAL)
Attest:

Edward M. Fletcher, Jr.                           EDWARD J. BRENNER
Attesting Officer                                    Commissioner of Patents

Disclaimer 3,359,665.—*Martin E. Gerry*, Santa Ana, Calif. COMBINATION SOUND AND SLIDE PROJECTOR. Patent dated Dec. 26, 1967. Disclaimer filed Dec. 10, 1968, by the inventor.

Hereby enters this disclaimer to claim 1 of said patent and the terminal portion of the term of the patent subsequent to Dec. 12, 1984.

[*Official Gazette March 4, 1969.*]